United States Patent
Cajias et al.

(10) Patent No.: US 11,821,739 B2
(45) Date of Patent: Nov. 21, 2023

(54) METHOD, APPARATUS, AND COMPUTER PROGRAM PRODUCT FOR GENERATING AND COMMUNICATING LOW BANDWIDTH MAP VERSION AGNOSTIC ROUTES

(71) Applicant: HERE Global B.V., Eindhoven (NL)

(72) Inventors: Raul Cajias, Berlin (DE); Daniel Rolf, Berlin (DE); David Falla Cepeda, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 344 days.

(21) Appl. No.: 17/118,048

(22) Filed: Dec. 10, 2020

(65) Prior Publication Data
US 2021/0381838 A1     Dec. 9, 2021

Related U.S. Application Data

(60) Provisional application No. 63/034,024, filed on Jun. 3, 2020.

(51) Int. Cl.
*G01C 21/34*     (2006.01)

(52) U.S. Cl.
CPC ................ *G01C 21/3446* (2013.01)

(58) Field of Classification Search
CPC ................................................ G01C 21/3804
See application file for complete search history.

(56) References Cited

U.S. PATENT DOCUMENTS

| | | | |
|---|---|---|---|
| 8,700,328 B1 * | 4/2014 | Raychev | G06Q 50/30 701/413 |
| 9,082,077 B2 | 7/2015 | Petersen et al. | |

(Continued)

FOREIGN PATENT DOCUMENTS

| | | |
|---|---|---|
| EP | 1 189 409 A2 | 3/2002 |
| EP | 3 109 591 A1 | 12/2016 |

OTHER PUBLICATIONS

Ho et al., *Efficient 3d Road Map Data Exchange for Intelligent Vehicles in Vehicular Fog Networks*, Hong Kong Polytechnic University and De La Salle University, Manila, Philippines, arXiv:2001.04057V1 [cs.NI] Jan. 13, 2020 (15 pages).

(Continued)

*Primary Examiner* — Peter D Nolan
*Assistant Examiner* — Jacob Kent Besteman-Street
(74) *Attorney, Agent, or Firm* — John J. McKearin; HERE GLOBAL B.V.

(57) ABSTRACT

Provided herein is a method of generating low bandwidth map format agnostic routes between origins and destinations for route communication between different map formats or versions using reduced bandwidth. Methods may include: receiving an indication of a route request between an origin and a destination; generating a route between the origin starting road segment and the destination target road segment, the route including a plurality of road segments; identifying one or more intermediate segments from the plurality of road segments, each intermediate segment having an anchor point; generating a plurality of route fragments from the route; encoding each route fragment by applying an XOR algorithm to identifiers of route fragment road segments of a respective route fragment; and providing the encoded route fragments and one or more anchor points of the one or more intermediate segments in response to the route request.

20 Claims, 13 Drawing Sheets

(56) References Cited

U.S. PATENT DOCUMENTS

| | | | |
|---|---|---|---|
| 9,933,269 B2* | 4/2018 | Maischberger | G01C 21/34 |
| 10,371,540 B2 | 8/2019 | Kluge | |
| 2007/0005238 A1 | 1/2007 | Adachi | |
| 2008/0189381 A1* | 8/2008 | Poirier | H04L 63/0428 |
| | | | 709/208 |
| 2016/0313132 A1* | 10/2016 | Larroy | G01C 21/34 |
| 2017/0314934 A1* | 11/2017 | Averbuch | G01S 19/50 |

OTHER PUBLICATIONS

Extended European Search Report for European Application No. 21176192.9 dated Nov. 12, 2021, 6 pages.

Jiang et al., "Design of a Multiple Bloom Filter for Distributed Navigation Routing", IEEE Transactions on Systems, Man and Cybernetics: Systems, vol. 44, No. 2, (Feb. 2014), 7 pages.

* cited by examiner

| Segment | 1 | 2 | 3 | 4 | 5 | 6 | 7 | 8 | 9 | 10 | 11 | 12 |
|---|---|---|---|---|---|---|---|---|---|---|---|---|
| LinkID HEX | a1 | b1 | 76 | fd | 71 | 89 | 20 | 4a | f8 | 11 | 24 | 8c |
| LinkID (in binary) | 1010 0001 | 1011 0001 | 0111 0110 | 1111 1101 | 0111 0001 | 1000 1001 | 0010 0000 | 0100 1010 | 1111 1000 | 0001 0001 | 0010 0100 | 1000 1100 |

FIG. 9

```
XF_0 = linkID(2) XOR linkID(3) XOR linkID(4)
XF_0 = b1 XOR 74 XOR fd

XF_0 =      1011 0001
            0111 0110
      XOR   1111 1101

XF_0 = 0011 1010    (BIN)
      XF_0 = 3a           (HEX)

XF_1 = linkID(6) XOR linkID(7) XOR linkID(8)
XF_1 = e3 (HEX)

XF_2 = linkID(10) XOR linkID(12)
XF_2 = 35 (HEX)
```

FIG. 10

```
XOR_ROUTE:{V_1_Midp-lat,  V_1_Midp-lon,  V_1_Midp-Zlevel;
          V_2_Midp-lat,  V_2_Midp-lon,  V_2_Midp-Zlevel;
    XF_0=3a;
    XF_1=e3;
    XF_2=35; }
```

FIG. 11

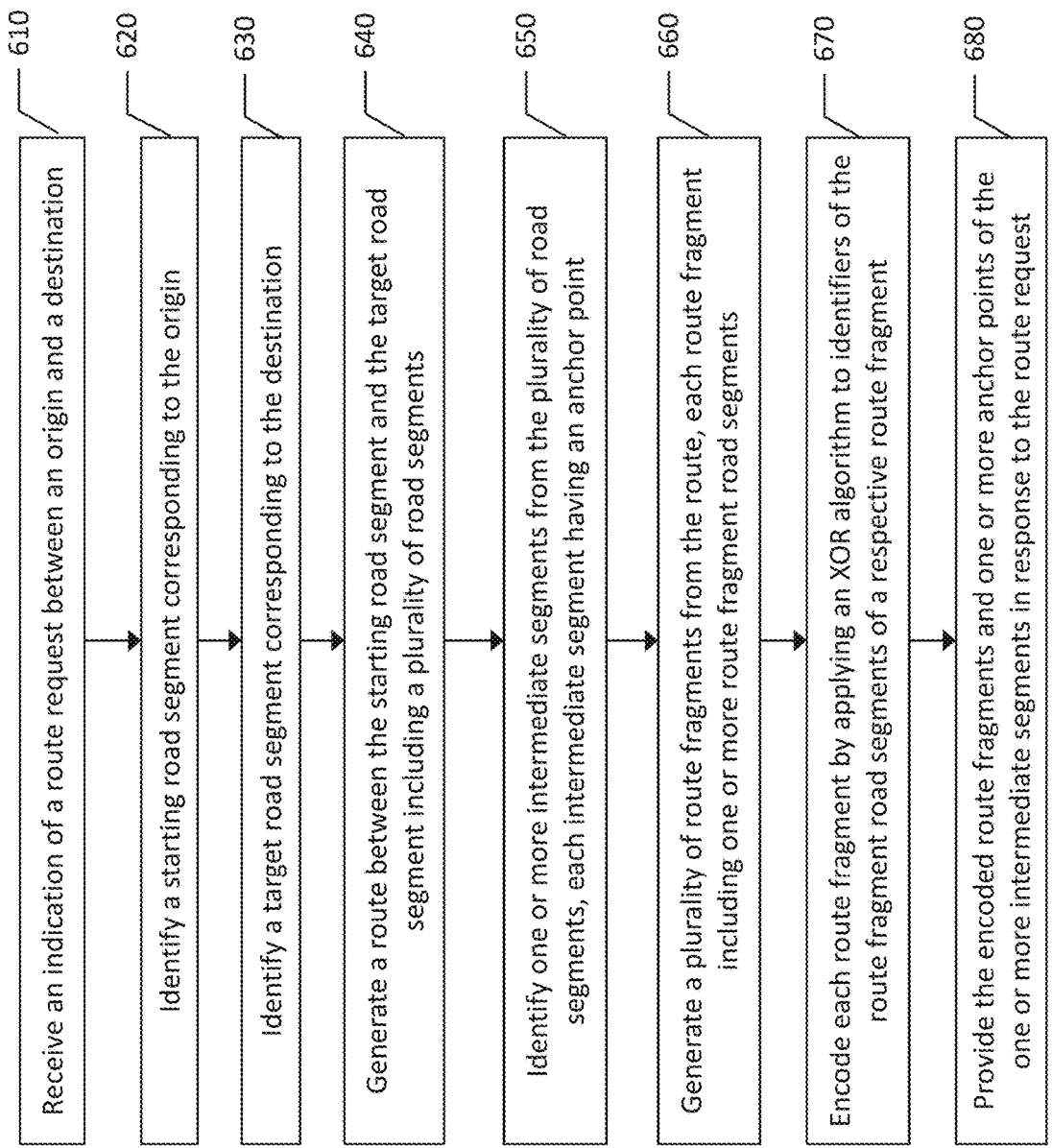

METHOD, APPARATUS, AND COMPUTER PROGRAM PRODUCT FOR GENERATING AND COMMUNICATING LOW BANDWIDTH MAP VERSION AGNOSTIC ROUTES

CROSS-REFERENCE TO RELATED APPLICATIONS

This application claims priority to U.S. Provisional Application Ser. No. 63/034,024, filed on Jun. 3, 2020, the contents of which are hereby incorporated by reference in their entirety.

TECHNOLOGICAL FIELD

Embodiments described herein generally relate to generating and communicating routes between origins and destinations to a client from a server, and more particularly, to generating and communicating low bandwidth map format agnostic routes between origins and destinations to allow route communication between different map formats or versions using reduced bandwidth.

BACKGROUND

Historically paper-based maps were periodically updated in terms of months, years, or longer to account for changes to road infrastructure. Map updates required substantial manual effort and printing of new maps based on the anticipated need. Paper maps have given way to digital maps which can be updated considerably more regularly, and can be of substantially greater detail including all manner of features from roadways to points-of-interest or other features that can be geo-located.

Digital maps can benefit from various data sources such as satellite imagery, crowd-sourced location and image data, crowd-sourced feature/point-of-interest information, municipal databases, map service provider data including sensor-equipped vehicles traveling along road networks, etc. The vast volumes of map-related data can be compiled, filtered, and analyzed to establish map updates and changes. These updates and changes can be implemented with relative ease and can be updated periodically or on-demand based on the latest available data. However, the frequency with which map data may be updated can relegate some digital maps as obsolete or out-of-date relatively quickly. Further, older map versions may be incompatible with newer map versions, particularly when substantial changes exist between the map versions. This problem leads to issues in the exchange of data between one map version and another, such as location data, point-of-interest data, road infrastructure data, or the like.

BRIEF SUMMARY

A method, apparatus, and computer program product are provided in accordance with an example embodiment for generating and communicating low bandwidth map format agnostic routes between origins and destinations to allow route communication between different map formats or versions using reduced bandwidth. Embodiments provided herein may include an apparatus having at least one processor and at least one memory including computer program code, the at least one memory and computer program code configured to, with the processor, cause the apparatus to at least: receive one or more intermediate segment anchor points for a requested route between an origin and a destination; receive encoded server-provided route fragments; identify one or more intermediate segments corresponding to the one or more intermediate segment anchor points; generate a route between the origin and the destination, the route including the one or more intermediate segments and a plurality of client-generated route fragments, each client-generated route fragment including one or more client-generated route fragment road segments; encode each client-generated route fragment by application of an XOR algorithm to the client-generated route fragment road segments of a respective client-generated route fragment; compare the encoded client-generated route fragments to the encoded server-provided route fragments; and provide navigational assistance for travelling along the route in response to the encoded client-generated route fragments corresponding with the encoded server-provided route fragments.

The client-generated route fragments may include route fragments extending between a starting road segment corresponding to the origin and an intermediate segment of the one or more intermediate segments, between intermediate segments in response to the one or more intermediate segments comprising two or more intermediate segments, and between an intermediate segment of the one or more intermediate segments and a target road segment corresponding to the destination. The apparatus of an example embodiment may be caused to provide an indication of a revised route fragment request between a starting point of a first encoded client-generated route fragment and an ending point of the first encoded client-generated route fragment in response to the first encoded client-generated route fragment failing to correspond to a first encoded server-generated route fragment.

The apparatus of an example embodiment may be caused to provide a request for a map update in response to at least one of: a first encoded client-generated route fragment failing to correspond with a first encoded server-generated route fragment; or one or more intermediate segment anchor points failing to correspond to the one or more intermediate segments. The request for the map update may include a request for a map update to a finite region of the map, where the finite region corresponds to a region including a road segment associated with the first encoded client-generated route fragment that failed to correspond with a first encoded server-generated route fragment or the one or more intermediate segment anchor points that fail to correspond to the one or more intermediate segments.

According to an example embodiment, causing the apparatus to provide an indication of a route request between an origin and a destination includes causing the apparatus to provide an indication of an anchor point of a road segment corresponding to the origin and an anchor point of a road segment corresponding to the destination. Causing the apparatus to identify one or more intermediate segments corresponding to the one or more intermediate segment anchor points may include causing the apparatus to map match the one or more intermediate segment anchor points to a corresponding intermediate road segment, where the one or more intermediate segment anchor points includes a midpoint of a respective intermediate road segment and an elevation level of a respective intermediate road segment. Causing the apparatus to provide an indication of a route request between an origin and a destination may include causing the apparatus to provide an indication of a number of intermediate segment anchor points between the origin and the destination, where causing the apparatus to receive one or more intermediate segment anchor points for the route between the starting road segment and the target road segment includes causing the apparatus to receive the requested number of intermediate segment anchor points between the origin and the destination.

Embodiments provided herein may include a computer program product having at least one non-transitory computer-readable storage medium having computer-executable program code portions stored therein, the computer-executable program code portions including program code instructions configured to: receive one or more intermediate segment anchor points for a requested route between an origin and a destination; receive encoded server-provided route fragments; identify one or more intermediate segments corresponding to the one or more intermediate segment anchor points; generate a route between the origin and the destination, the route including the one or more intermediate segments and a plurality of client-generated route fragments, each client-generated route fragment including one or more client-generated route fragment road segments; encode each client-generated route fragment by application of an XOR algorithm to the client-generated route fragment road segments of a respective client-generated route fragment; compare the encoded client-generated route fragments to the encoded server-provided route fragments; and provide navigational assistance for traveling along the route in response to the encoded client-generated route fragments corresponding with the encoded server-provided route fragments.

The client-generated route fragments may include route fragments extending between a starting road segment corresponding to the origin and an intermediate segment of the one or more intermediate segments, between intermediate segments in response to the one or more intermediate segments comprising two or more intermediate segments, and between an intermediate segment of the one or more intermediate segments and a target road segment corresponding to the destination. The computer program product of an example embodiment may further include program code instructions to provide an indication of a revised route fragment request between a starting point of a first encoded client-generated route fragment and an ending point of the first encoded client-generated route fragment in response to the first encoded client-generated route fragment failing to correspond to a first encoded server-generated route fragment.

According to an example embodiment, the computer program product may include program code instructions to provide a request for a map update in response to at least one of: a first encoded client-generated route fragment failing to correspond with a first encoded server-generated route fragment; or one or more intermediate segment anchor points failing to correspond to the one or more intermediate segments. The request for the map update may include a request for a map update to a finite region of the map, where the finite region corresponds to a region including a road segment associated with the first encoded client-generated route fragment that failed to correspond with a first encoded server-generated route fragment or the one or more intermediate segment anchor points that fail to correspond to the one or more intermediate segments.

According to an example embodiment, the program code instructions to provide an indication of a route request between an origin and a destination may include program code instructions to provide an indication of an anchor point of a road segment corresponding to the origin and an anchor point of a road segment corresponding to the destination. The program code instructions to identify one or more intermediate segments corresponding to the one or more intermediate segment anchor points may include program code instructions to: map match the one or more intermediate segment anchor points to a corresponding intermediate road segment, where the one or more intermediate segment anchor points includes a midpoint of a respective road segment and an elevation level of the respective intermediate road segment. The program code instructions to provide an indication of a route request between an origin and a destination may include program code instructions to provide an indication of a number of intermediate segment anchor points between the origin and the destination, where causing the apparatus to receive one or more intermediate segment anchor points for the route between the starting road segment and the target road segment includes causing the apparatus to receive the requested number of intermediate segment anchor points between the origin and the destination.

Embodiments provided herein may provide a method, where the method includes: receiving one or more intermediate segment anchor points for a requested route between an origin and a destination; receiving encoded server-provided route fragments; identifying one or more intermediate segments corresponding to the one or more intermediate segment anchor points; generating a route between the origin and the destination, the route including the one or more intermediate segments and a plurality of client-generated route fragments, each client-generated route fragment including one or more client-generated route fragment road segments; encoding each client-generated route fragment by application of an XOR algorithm to the client-generated route fragment road segments of a respective client-generated route fragment; comparing the encoded client-generated route fragments to the encoded server-provided route fragments; and providing navigational assistance for traveling along the route in response to the encoded client-generated route fragments corresponding with the encoded server-provided route fragments.

The client-generated route fragments may include route fragments extending between a starting road segment corresponding to the origin and an intermediate segment of the one or more intermediate segments, between intermediate segments in response to the one or more intermediate road segments including two or more intermediate road segments, and between an intermediate road segment of the one or more intermediate road segments and a target road segment corresponding to the destination. Methods may include providing an indication of a revised route fragment request between a starting point of a first encoded client-generated route fragment and an ending point of the first encoded client-generated route fragment in response to the first encoded client-generated route fragment failing to correspond to a first encoded server-generated route fragment. Methods may include providing a request for a map update in response to at least one of: a first encoded client-generated route fragment failing to correspond with a first encoded server-generated route fragment; or one or more intermediate segment anchor points failing to correspond to the one or more intermediate segments.

Embodiments provided herein may provide an apparatus including: means for receiving one or more intermediate segment anchor points for a requested route between an origin and a destination; means for receiving encoded server-provided route fragments; means for identifying one or more intermediate segments corresponding to the one or more intermediate segment anchor points; means for generating a route between the origin and the destination, the route including the one or more intermediate segments and a plurality of client-generated route fragments, each client-generated route fragment including one or more client-generated route fragment road segments; means for encoding each client-generated route fragment by application of an XOR algorithm to the client-generated route fragment road segments of a respective client-generated route fragment; means for comparing the encoded client-generated route fragments to the encoded server-provided route fragments; and means for providing navigational assistance for traveling along the route in response to the encoded client-generated route fragments corresponding with the encoded server-provided route fragments.

The client-generated route fragments may include route fragments extending between a starting road segment corresponding to the origin and an intermediate segment of the one or more intermediate segments, between intermediate segments in response to the one or more intermediate road segments including two or more intermediate road segments, and between an intermediate road segment of the one or more intermediate road segments and a target road segment corresponding to the destination. An example apparatus may include means for providing an indication of a revised route fragment request between a starting point of a first encoded client-generated route fragment and an ending point of the first encoded client-generated route fragment in response to the first encoded client-generated route fragment failing to correspond to a first encoded server-generated route fragment. An example apparatus may include means for providing a request for a map update in response to at least one of: a first encoded client-generated route fragment failing to correspond with a first encoded server-generated route fragment; or one or more intermediate segment anchor points failing to correspond to the one or more intermediate segments.

Embodiments provided herein may include an apparatus having at least one processor and at least one memory including computer program code, the at least one memory and computer program code configured to, with the processor, cause the apparatus to: receive an indication of a route request between an origin and a destination; identify a starting road segment corresponding to the origin; identify a target road segment corresponding to the destination; generate a route between the starting road segment and the target road segment, the route including a plurality of road segments; identify one or more intermediate segments from the plurality of road segments, each intermediate segment having an anchor point; generate a plurality of route fragments from the route, each route fragment including one or more route fragment road segments; encode each route fragment by applying an XOR algorithm to identifiers of the route fragment road segments of a respective route fragment; and provide the encoded route fragments and one or more anchor points of the one or more intermediate segments in response to the route request.

The route request between the origin and the destination may include identification of an anchor point and elevation of a road segment corresponding to the origin and identification of an anchor point and elevation of a road segment corresponding to the destination, where causing the apparatus to identify the starting road segment and to identify the target road segment includes causing the apparatus to: identify the starting road segment based on the anchor point and elevation of the road segment corresponding to the origin; and identify the target road segment based on the anchor point and elevation of the road segment corresponding to the destination. Causing the apparatus to establish a plurality of route fragments from the route may include causing the apparatus to establish route fragments having one or more road segments between the starting road segment and a first intermediate road segment, between a last intermediate road segment and the target road segment, and between any intermediate road segments.

According to an example embodiment, causing the apparatus to identify one or more intermediate segments may include causing the apparatus to select one or more intermediate road segments along the route between the starting road segment and the target road segment, where the one or more intermediate road segments is less than a total number of road segments between the starting road segment and the target road segment. The one or more intermediate road segments may be selected based on a number of intermediate road segments and a total length of the route.

According to an example embodiment, each of the one or more intermediate road segments may include an elevation, where causing the apparatus to provide the encoded route fragments and one or more anchor points of the one or more intermediate segments in response to the route request may include causing the apparatus to provide the encoded route fragments, the one or more anchor points of the one or more intermediate segments, and the one or more elevations of the one or more intermediate segments in response to the route request. The encoded route fragments may include a first encoded route fragment between a starting point of a corresponding first route fragment and an ending point of the first route fragment, where the apparatus is further caused to: receive a request for a revised encoded route fragment to replace the first encoded route fragment and at least one banned road segment; generate a revised route between the starting point of the first route fragment and the ending point of the first route fragment, where the revised route is generated to exclude the at least one banned road segment; encode the revised route fragment to generate a revised encoded route fragment; and provide the revised encoded route fragment in response to the request for the revised encoded route fragment.

Embodiments provided herein may include a computer program product including at least one non-transitory computer-readable storage medium having computer-executable program code portions stored therein, the computer-executable program code portions including program code instructions configured to: receive an indication of a route request between an origin and a destination; identify a starting road segment corresponding to the origin; identify a target road segment corresponding to the destination; generate a route between the starting road segment and the target road segment, the route including a plurality of road segments; identify one or more of the plurality of road segments as intermediate segments, each intermediate segment having an anchor point; generate a plurality of route fragments from the route, each route fragment including one or more route fragment road segments; encode each route fragment by applying an XOR algorithm to identifiers of the route fragment road segments of a respective route fragment; and provide the encoded route fragments and one or more anchor points of the one or more intermediate segments in response to the route request.

The route request between the origin and the destination may include identification of an anchor point and elevation of a road segment corresponding to the origin and identification of an anchor point and elevation of a road segment corresponding to the destination, where the program code instructions to identify the starting road segment and to identify the target road segment includes program code instructions to: identify the starting road segment based on the anchor point and elevation of the road segment corresponding to the origin; and identify the target road segment based on the anchor point and elevation of the road segment corresponding to the destination. The program code instructions to establish a plurality of route fragments from the route may include program code instructions to establish route fragments including one or more road segments between the starting road segment and a first intermediate road segment, between a last intermediate road segment and the target road segment, and between any intermediate road segments.

The program code instructions to identify one or more intermediate segments may include program code instructions to select one or more intermediate road segments along the route between the starting road segment and the target road segment, where the one or more intermediate road segments is less than a total number of road segments between the starting road segment and the target road segment. The one or more intermediate road segments may be selected based on a number of intermediate road segments and a total length of the route.

According to an example embodiment, each of the one or more intermediate segments further includes an elevation, and where the program code instructions to provide the encoded route fragments and one or more anchor points of the one or more intermediate segments in response to the route request may include program code instructions to provide the encoded route fragments, the one or more anchor points of the one or more intermediate segments, and the one or more elevations of the one or more intermediate segments in response to the route request. The encoded route fragments may include a first encoded route fragment extending between a starting point of a corresponding first route fragment and an ending point of the first route fragment, the computer program product further including program code instructions to: receive a request for a revised encoded route fragment to replace the first encoded route fragment and at least one banned road segment; generate a revised route fragment between the starting point of the first route fragment and the ending point of the first route fragment, where the revised route is generated to exclude the at least one banned road segment; encode the revised route fragment to generate a revised encoded route fragment; and provide the revised encoded route fragment in response to the request for the revised encoded route fragment.

Embodiments provided herein may include a method, the method including: receiving an indication of a route request between an origin and a destination; identifying a starting road segment corresponding to the origin; identifying a target road segment corresponding to the destination; generating a route between the starting road segment and the target road segment, the route including a plurality of road segments; identifying one or more intermediate segments from the plurality of road segments, each intermediate segment having an anchor point; generating a plurality of route fragments from the route, each route fragment including one or more route fragment road segments; encoding each route fragment by applying an XOR algorithm to identifiers of the route fragment road segments of a respective route fragment; and providing the encoded route fragments and one or more anchor points of the one or more intermediate segments in response to the route request.

The route request between the origin and the destination may include identification of an anchor point and elevation of a road segment corresponding to the origin and identification of an anchor point and elevation of a road segment corresponding to the destination, where identifying the starting road segment and identifying the target road segment includes: identifying the starting road segment based on the anchor point and elevation of the road segment corresponding to the origin; and identifying the target road segment based on the anchor point and elevation of the road segment corresponding to the destination. Establishing a plurality of route fragments from the route may include establishing route fragments including one or more road segments between the starting road segment and a first intermediate segment, between a last intermediate road segment and the target road segment, and between any intermediate road segments.

According to an example embodiment, identifying one or more intermediate segments includes selecting one or more intermediate road segments along the route between the starting road segment and the target road segment, where the one or more intermediate road segments is less than a total number of road segments between the starting road segment and the target road segment. The one or more intermediate road segments may be selected based on a number of intermediate road segments and a total length of the route. Each of the one or more intermediate road segments may include an elevation, where providing the encoded route fragments and one or more anchor points of the one or more intermediate segments in response to the route request may include providing the encoded route fragments, the one or more anchor points of the one or more intermediate segments, and the one or more elevations of the one or more intermediate segments in response to the route request.

Embodiments provided herein may include an apparatus, the apparatus including: means for receiving an indication of a route request between an origin and a destination; means for identifying a starting road segment corresponding to the origin; means for identifying a target road segment corresponding to the destination; means for generating a route between the starting road segment and the target road segment, the route including a plurality of road segments; means for identifying one or more intermediate segments from the plurality of road segments, each intermediate segment having an anchor point; means for generating a plurality of route fragments from the route, each route fragment including one or more route fragment road segments; means for encoding each route fragment by applying an XOR algorithm to identifiers of the route fragment road segments of a respective route fragment; and means for providing the encoded route fragments and one or more anchor points of the one or more intermediate segments in response to the route request.

The route request between the origin and the destination may include identification of an anchor point and elevation of a road segment corresponding to the origin and identification of an anchor point and elevation of a road segment corresponding to the destination, where the means for identifying the starting road segment and identifying the target road segment includes: means for identifying the starting road segment based on the anchor point and elevation of the road segment corresponding to the origin; and means for identifying the target road segment based on the anchor point and elevation of the road segment corresponding to the destination. The means for establishing a plurality of route fragments from the route may include means for establishing route fragments including one or more road segments between the starting road segment and a first intermediate segment, between a last intermediate road segment and the target road segment, and between any intermediate road segments.

According to an example embodiment, the means for identifying one or more intermediate segments includes means for selecting one or more intermediate road segments along the route between the starting road segment and the target road segment, where the one or more intermediate road segments is less than a total number of road segments between the starting road segment and the target road segment. The one or more intermediate road segments may be selected based on a number of intermediate road segments and a total length of the route. Each of the one or more intermediate road segments may include an elevation, where the means for providing the encoded route fragments and one or more anchor points of the one or more intermediate segments in response to the route request may include means for providing the encoded route fragments, the one or more anchor points of the one or more intermediate segments, and the one or more elevations of the one or more intermediate segments in response to the route request.

BRIEF DESCRIPTION OF THE DRAWINGS

Figure 1:
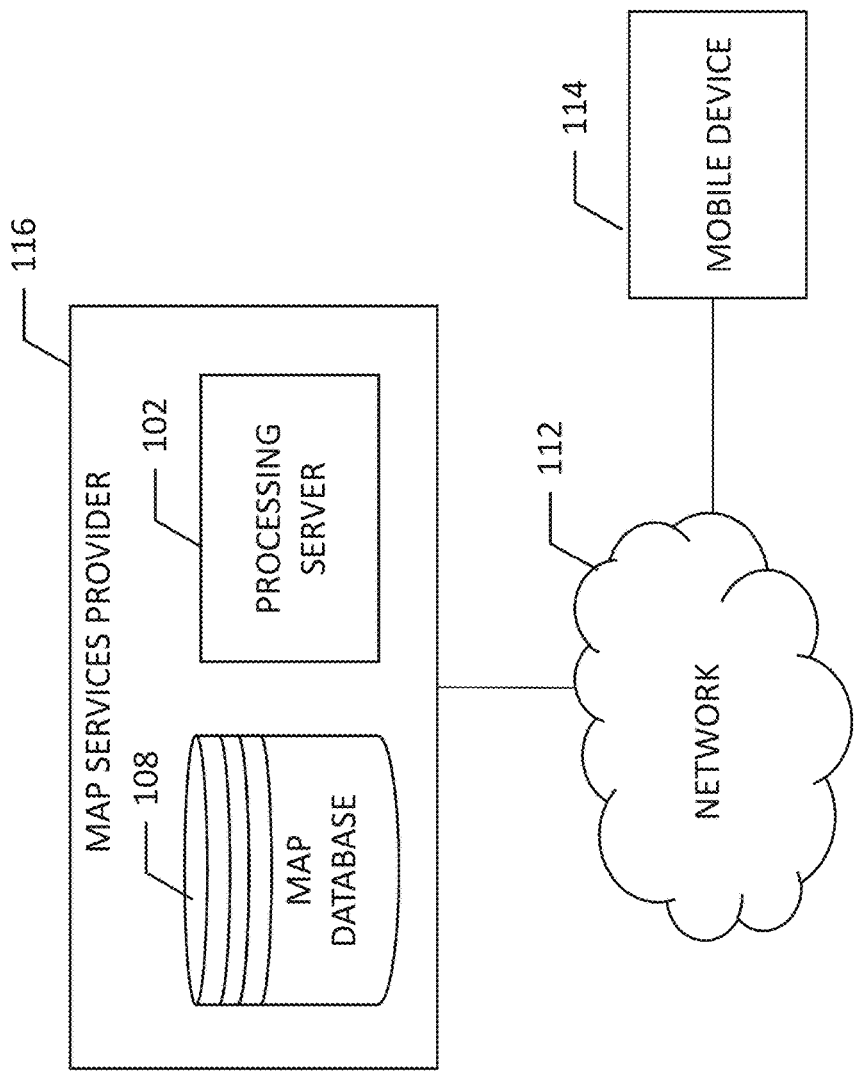
Figure 2:
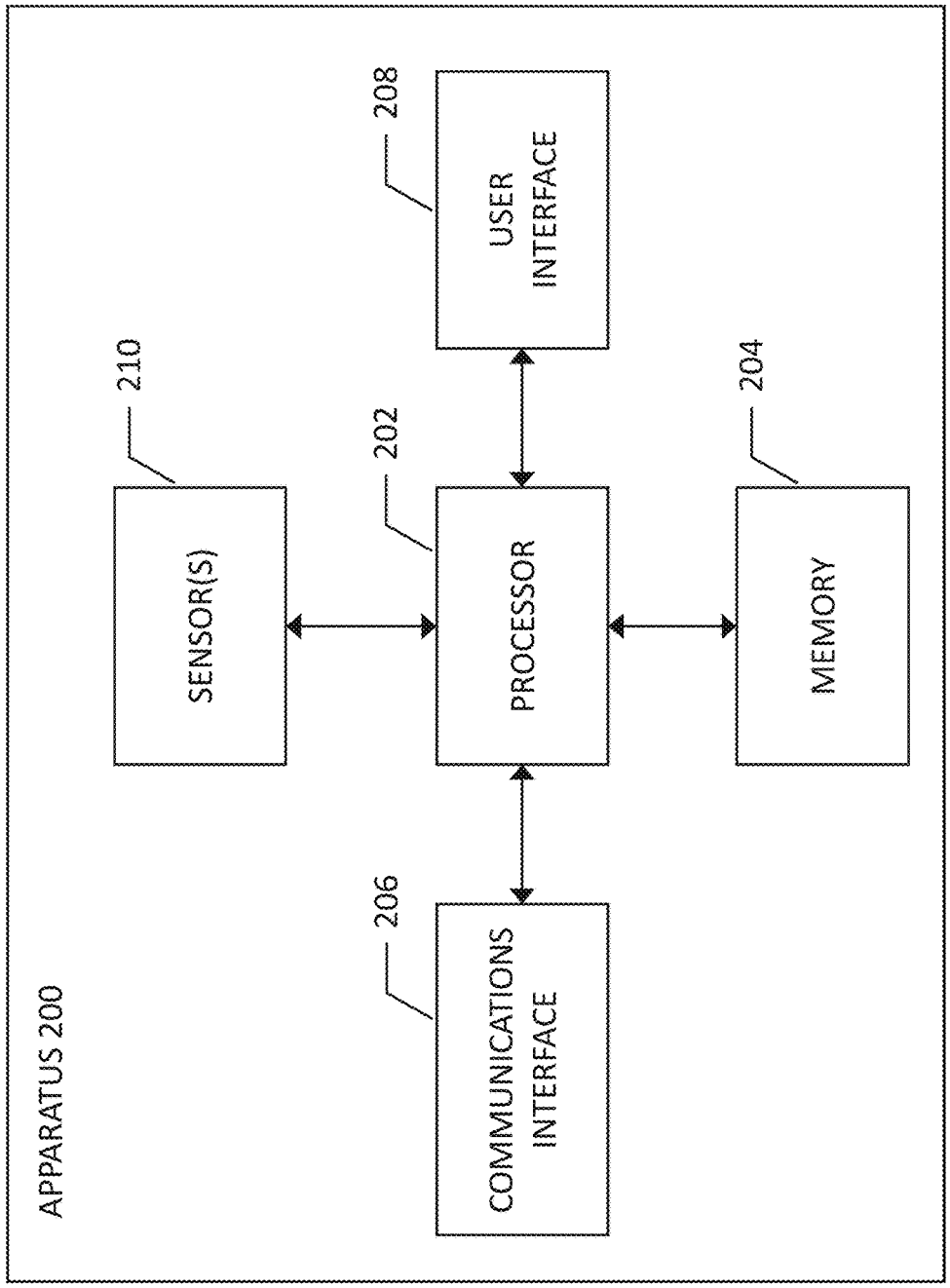
Figure 3:
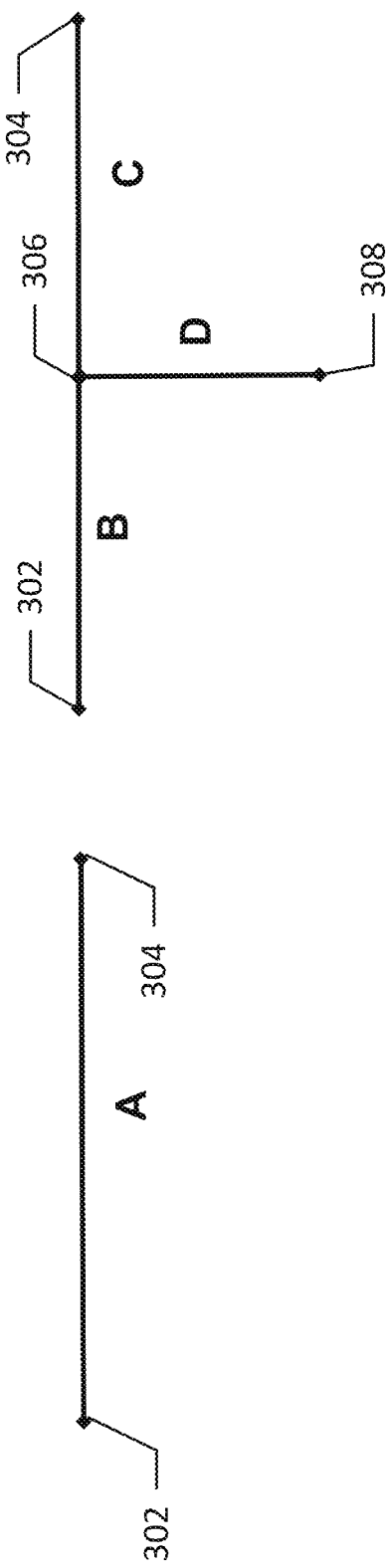
Figure 4:
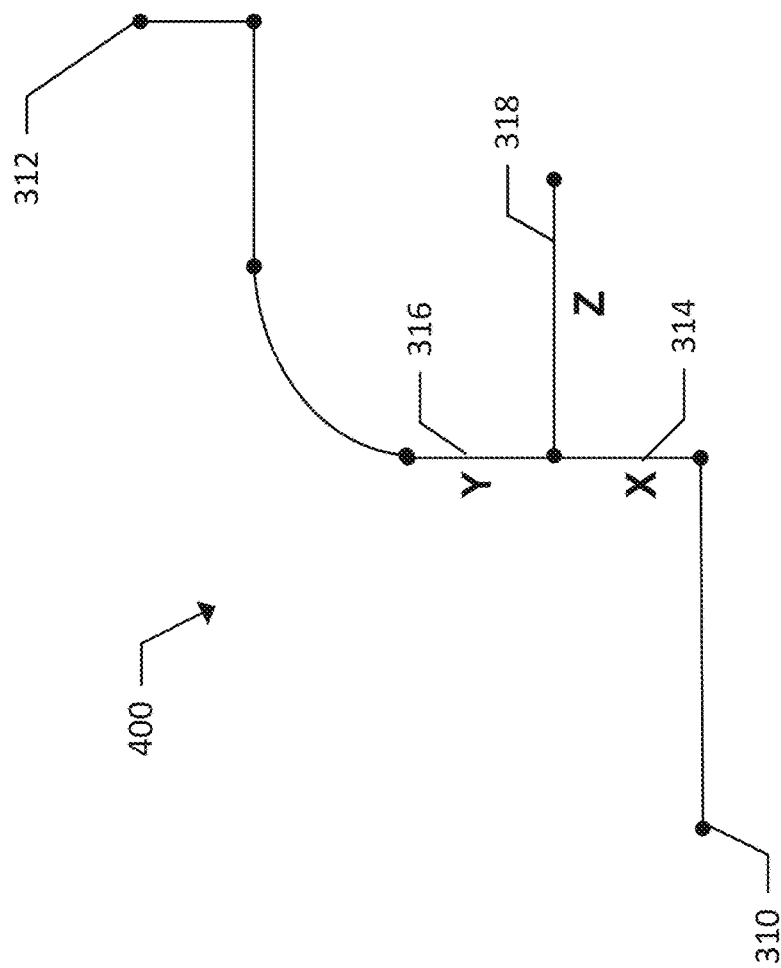
Figure 5:
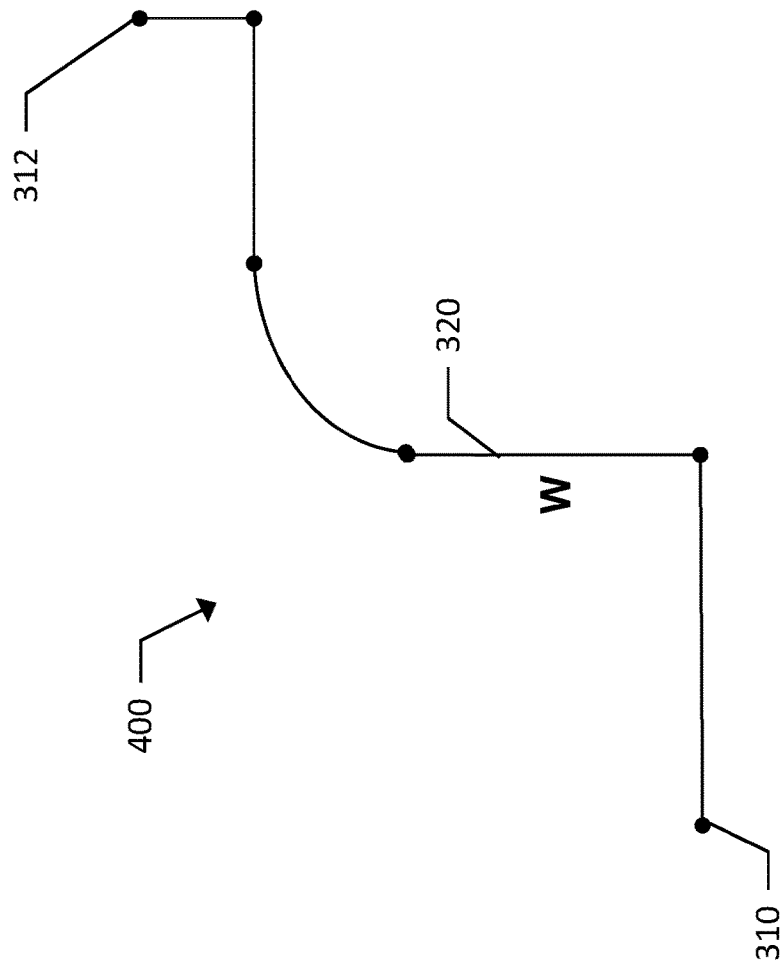
Figure 6:
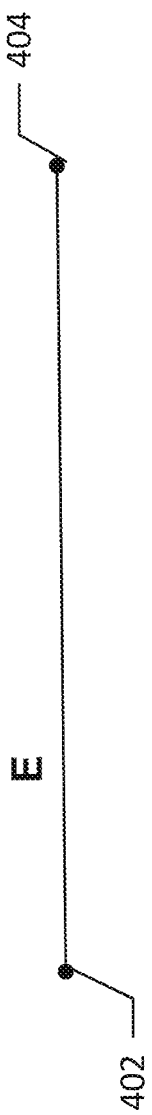
Figure 7:
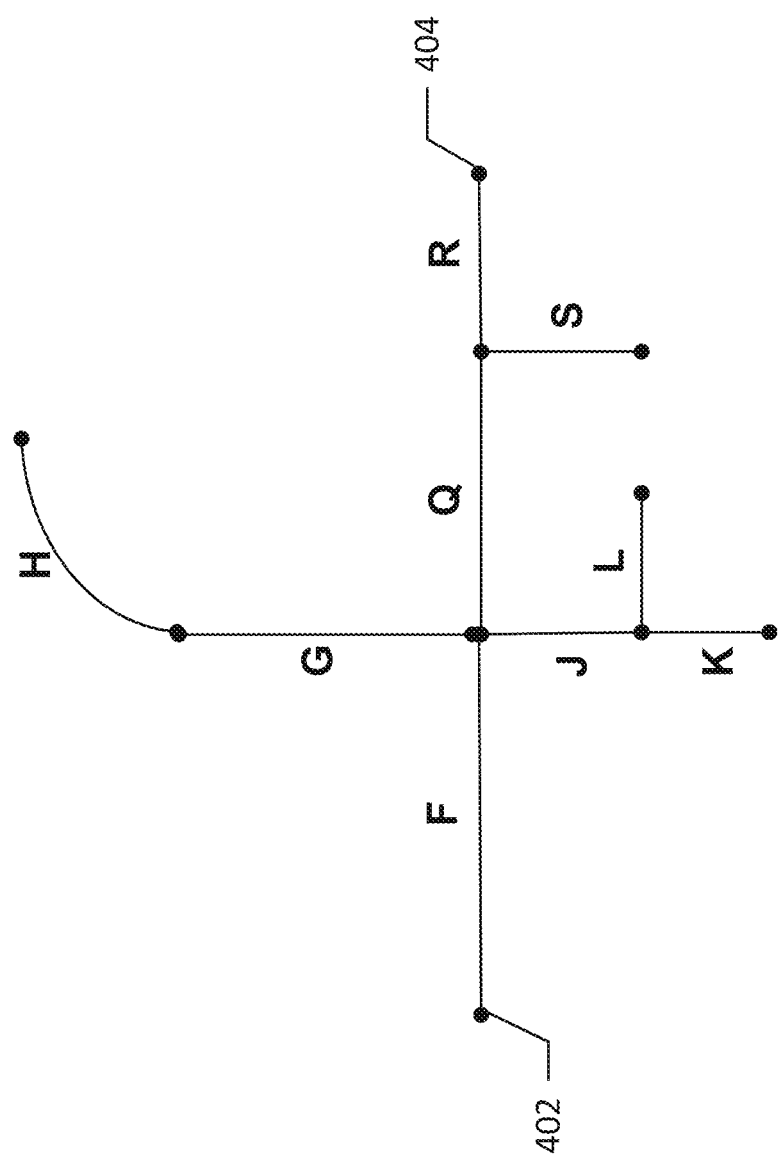
Figure 8:
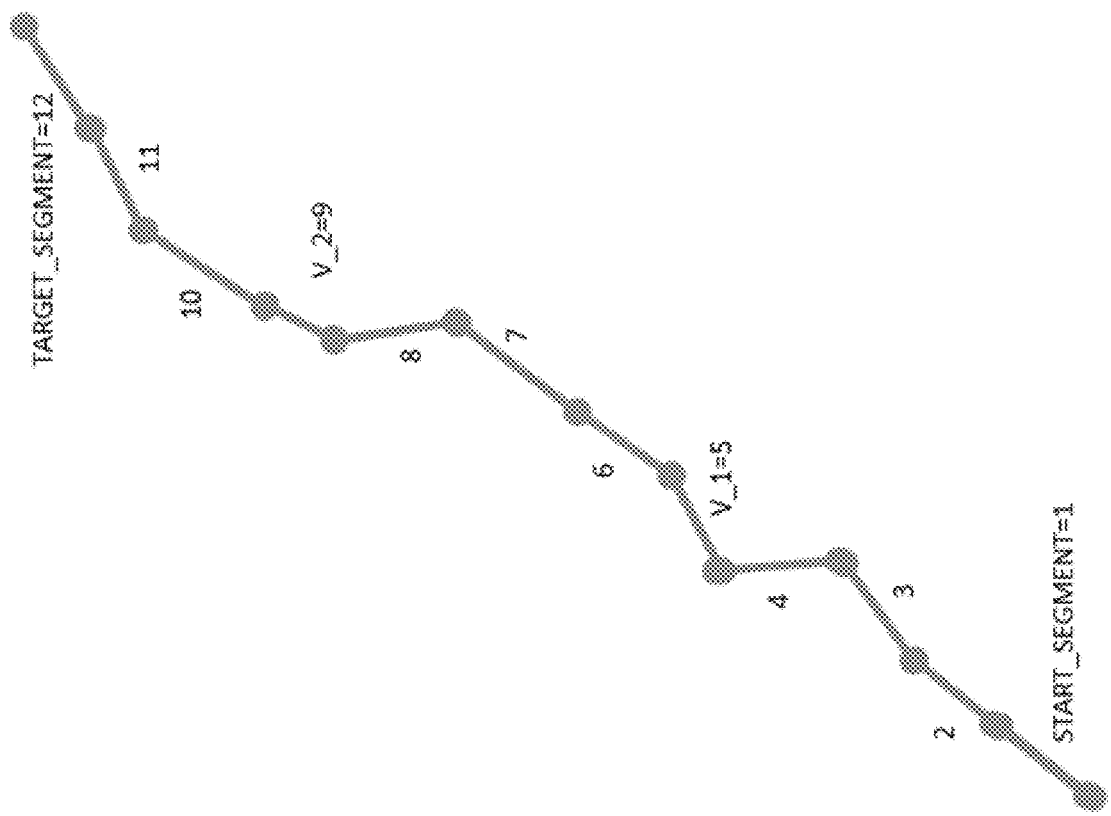
Figure 12:
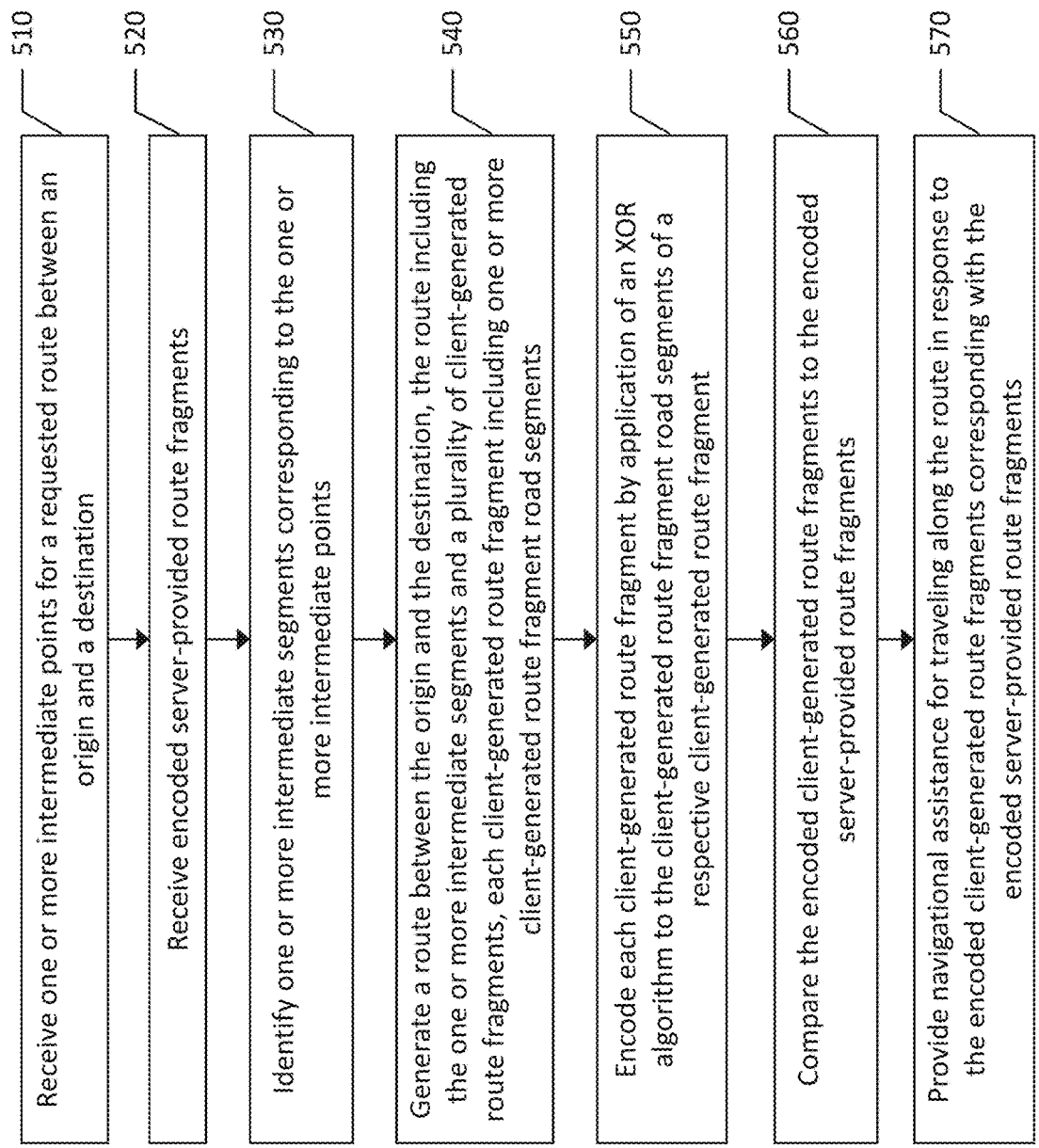

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for correlating road segment/link identifiers between different versions of a map in accordance with an example embodiment of the present disclosure;

FIG. 3 illustrates a road link split into two road links with the addition of a new road link and node according to an example embodiment of the present disclosure;

FIG. 4 illustrates a road network including road links according to an example embodiment of the present disclosure;

FIG. 5 illustrates the road network of FIG. 4 with a road link and node removed according to an example embodiment of the present disclosure;

FIG. 6 illustrates a road link defined between two end nodes according to an example embodiment of the present disclosure;

FIG. 7 illustrates the road link of FIG. 6 split into three road links according to an example embodiment of the present disclosure;

FIG. 8 illustrates a route between a starting road segment and a target road segment including a plurality of road segments according to an example embodiment of the present disclosure;

FIG. 9 is a table identifying the link identifiers in both hexadecimal and binary for the road segments of the route of FIG. 8 according to an example embodiment of the present disclosure;

FIG. 10 illustrates the logic for establishing encoded route fragments according to an example embodiment of the present disclosure;

FIG. 11 illustrates the encoded route provided by a server to a client according to an example embodiment of the present disclosure;

FIG. 12 is a flowchart of a method for generating and communicating low bandwidth map format agnostic routes between origins and destinations according to an example embodiment of the present disclosure; and FIG. 13 is a flowchart of another method for generating and communicating low bandwidth map format agnostic routes between origins and destinations according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for generating and communicating routes between origins and destinations to a client from a server, and more particularly, to generating and communicating low bandwidth map format agnostic routes between origins and destinations to allow route communication between different map formats or versions using reduced bandwidth. Embodiments described herein are uniquely capable of identifying map elements that have changed between map versions and ensuring proper correlation between old map elements and revised map elements in the event that maps and map versions do not have compatible road segment identifiers or other incompatibilities that may otherwise inhibit conventional route communication and navigation. Further, embodiments enable communication of the route using a lower bandwidth to reduce the amount of data transmitted between the client and the server, thereby improving the efficiency of route generation and communication.

FIG. 1 illustrates a communication diagram of an example embodiment of a system for implementing example embodiments described herein. The illustrated embodiment of FIG. 1 includes a map services provider system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, an electronic control unit, or an advanced driver assistance system (ADAS), or a controller that facilitates autonomous or semi-autonomous driving, for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map services provider 116.

The map database 108 may include node data, road segment/link data, point of interest (POI) data, or the like. The map database 108 may also include cartographic data, routing data, and/or maneuvering data. According to some example embodiments, the road segment/link data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road links/segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider, and may be periodically updated based on new roads, re-routing of existing roads, changes in points-of-interest, etc. By way of example, the map services provider can collect geographic data to generate and enhance the map database 108. According to some embodiments, the map database 108 may delegate map generation and revision to other devices, such as mobile device 114. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. The map data gathered from among various sources may be compiled into map updates that may take place periodically or as needed, resulting in a dynamic map database 108 that is routinely changed and updated to reflect the most accurate representation of the roads and features of a region.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such as map data regarding a specific roadway, may be downloaded or stored temporarily on an end user device, and according to various embodiments described herein, the mobile device 114 may be configured to modify the map data regarding a roadway before sending the map data back to the map database 108.

According to some embodiments, a server side map database 108 and a client side map database may be different. For example, even when the map data of both map databases is from the same map services provider 116, the map data may differ from server side to client side. This may be due to different map versions existing and being updated at different periodic rates. Further, client map data and server map data may differ when the map data originates from different sources. Different map data and map versions between a client and a server may be problematic when routing services are required by the mobile device 114 and provided by the map services provider 116. Road links that are identified by unique identifiers in a server side map database 108 may be incompatible with identifiers or road links of a client side map database. As such, embodiments provided herein use an identifier-independent protocol to provide a server side generated route to a client.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device is provided for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data from a mobile device 114 or a device in communication with mobile device 114. The mobile device 114 may include one or more detectors or sensors as a positioning system built or embedded into or within the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a processor of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and longitudinal position, and/or height, GPS coordinates, wireless network positioning, such as Wi-Fi Bluetooth™ positioning, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like. Probe data collected by a mobile device 114 may be error prone, where probe data location information may not correspond precisely with the actual physical location of the probe. For example, probes traveling through urban canyons, forests, or actual canyons may have probe data point locations that are very noisy in that they do not correspond well with the actual location of the probe due to signal noise and issues with positioning means for detecting the location of the probe.

An example embodiment of a processing server 102 may be embodied in an apparatus as illustrated in FIG. 2. The apparatus, such as that shown in FIG. 2, may be specifically configured in accordance with an example embodiment of the present invention for connecting server generated routes along road segments between an origin and a destination to client device map data, even when the server side map data differs from the client side map data. The apparatus may include or otherwise be in communication with a processor 202, a memory device 204, a communication interface 206, a user interface 208, and one or more sensors 210. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The sensors 210 may include sensors such as GPS sensors, LiDAR sensors, proximity sensors, image sensors, accelerometers, or any such sensors that may facilitate location identification, autonomous vehicle control, or the like. Such sensors 210 may be in communication with one or more processors 202 of the apparatus 200 to provide information regarding a vehicle when the apparatus is embodied as a client or mobile device 114.

Example embodiments of the present disclosure may provide a mechanism for identifying road links between two different map versions that may have different link identifiers in order to identify routes, addresses, traffic, or other information from a first system to a second system, operating with different map versions. According to an example embodiment, map information, such as paths of roadways, direction of traffic on said roadways, intersections, and the like may be stored, for example, on a server-side map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths. Additional map update triggers may include changes associated with roadways such as speed limits changing on a road, which may also prompt segmentation of a road link resulting in new road links with new road link identifiers, for example.

The server-side map database 108 may identify road links by road link identifiers used to uniquely identify road links, where a sequence of identified road segments may be used as a route between an origin and a destination. However, client-side map data may not be as up to date as server-side map data. Client-side map data may be map data that is provided with a navigation system or application, and may not receive the periodic updates afforded a server-side map database 108. Consequently, the client map data may not match the server-side map data, and the unique identifiers used to identify road links in the server-side map data may not correspond to unique identifiers of corresponding road links in client map data. Further, roads may change through new construction, through the addition or demolition or roadways, through re-routing of roadways and traffic patterns, or the like. Thus, a route generated by a server-side map service provider 116 may reference road links through unique identifiers that do not correspond to an equivalent route on the client-side map data.

While example embodiments described herein generally relate to correlating road links between a server and a client for route guidance purposes, the correlation of road links between two different systems may be performed for a variety of reasons. For example, a server may communicate information about a geographic region to a client, such as traffic events, road closures, or other factor that may be of interest to a user. In communicating this information, the server may identify a road link along which an event is occurring or for which information is available. The client may have a different map version such that it is important to properly translate the road link identification between map versions. Thus, correlating of road links between map versions can be performed for any of a variety of reasons. Further, while example embodiments described herein may primarily relate to server-side and client-side map versions and conversion, embodiments may be employed between client devices, such as two users communicating between each other to identify a road segment, for example.

Example embodiments described herein provide a mechanism to reliably and repeatably correlate road links between different map versions. According to an example embodiment, in order for a client side device to properly receive, interpret, and present route guidance or navigation generated by a server-side map services provider 116, the server and the client need to be able to correlate road links between a server-side map version and a client-side map version for information, such as a route to a destination, that is computed on the server-side may be transferred to the client and properly understood/translated. The unique identifiers of map road segments/links used to describe a sequence of road links in a route or the unique identifiers of map road links used to provide information to a user must match in the same map data and version for conventional route transfer between servers and clients. However, example embodiments described herein may correlate road links between two different map versions to enable communication of road link related information (e.g., route guidance, point of interest information, etc.) between two different map versions even when road link identifiers do not match.

If, for example, a map service provider maintains map support for four years, and releases a new map update/version every quarter, and has four different map format versions used in the field, the map service provider would need to keep four quarters (4) of four years (4) for four map formats (4) for a total of 64 map versions that would have to be simultaneously maintained on servers to anticipate that some device having any of the 64 variants may request a route from the map services provider. This approach does not scale for rapid refresh (e.g., weekly/daily releases) as illustrated due to the unsustainable growth of map variants that would need to be maintained. The more map variants needed results in greater memory consumption and lower processing performance. Embodiments described herein define a route and the workflow between a client and server that is based on retracing the route between via points of a route and verifying fingerprints of the fragments of the route, thereby avoiding the need to have identical versions of a map between a server and a client.

Embodiments described herein define a scheme of a map services provider 116, such as in map editing software executed by the processing server 102 or during map compilation that generates map element (e.g., road segment or link) identifiers in such a way that the identifiers clearly relate between corresponding map elements between two different map versions. Embodiments described herein may be employed for all graph representations of the real world. Conventional stable topology links for two-dimensional maps may be used to represent the road network. The two-dimensional map may be modeled as nodes and links. Links span between nodes and nodes connect one or more links. The degree of a node is the number of links it connects. A node is referred to as bi-valent if it connects exactly two links. A mono-valent node is an end point of a road, such as a dead end or a cul-de-sac. A map as defined herein may be a stable topology map if it does not contain any bi-valent nodes. The links are then considered stable topology links. Stable topology links are generally stable as they typically only change when new roads are built.

FIG. 3 illustrates an example embodiment of link identifiers changing in response to a change in the stable topology map. As shown, link A is a single link between two end nodes 302 and 304. A new road, link D, is constructed and added to the topology joining former link A at new node 306. The node 306 is required as any intersection between roads is at a node. The insertion of new node 306 breaks link A into two segments, link B and link C. Link B and link C are each assigned a new identifier, different from link A from which they were formed. This change can be problematic for conventional map systems. Two different versions of a map may differ in the nodes and link identifiers. One version of a map may include link A, while another version of the map includes new link D and consequently links B and C instead of link A. Conventional map software may not be able to resolve the differences due to the differing link identifiers. For example, if a route generated from the new version of the map including link B and link C, a navigation system of a vehicle employing the old version of the map may not be able to find links B and C on their map such that the route is not understood and rejected by the navigation system. Embodiments described herein resolve this issue by enabling correlation between versions of a map to identify links B and C from link A to make compatible the map versions.

Embodiments described herein employ an XOR function or XOR logic gate. The XOR function is a logic gate that gives a "true" output when the number of true inputs is odd. The XOR function, sometimes called the "Exclusive OR", provides a "true" output if one and only one of the inputs to the function is true. The XOR function represents an inequality function where the output is true if the inputs are not alike, otherwise the output is false. XOR provides a true output when for a logic issue where one or the other of two inputs is true, but not both. An n-bit XOR function is made from n gates. For instance, the statement $x\_1$ XOR $x\_2$ would mean an XOR between the first bit and the second bit of ID=x. Bit-wise XOR involves where corresponding bits from two identifiers (e.g., 6-bit identifiers) are logically XOR'd to form a corresponding bit in a third identifier. An example may include 6-bit identifiers including identifier A=011101 and identifier B=001011. The X OR identifier applied to identifiers A and B would result in identifier C=010110, where a zero is present when the XOR is false (bits are equal) and a one is present where the XOR is true (bits are not equal).

According to example embodiments described herein, $XOR(x\_1, \ldots, x\_n)$ denotes the sequentially applied bitwise XOR function, otherwise represented as x_1 XOR ... XOR x_n. The XOR function is associative with the possibility of arbitrary grouping. As an example:

If z=x XOR y, then x XOR(y XOR z)=(x XOR y)XOR Z

The XOR function is applied herein to correlate link identifiers between different map versions enabling the translation of a map identifier of one version of a map to a different identifier or plurality of identifiers in another version of the map. According to an example embodiment, 128-bit or 64-bit link identifiers may be used. Referring to the example illustration of FIG. 3, link A has a 128-bit number identifier assigned thereto. When a new link is added to the map and intersects link A, as shown by link D intersecting former link A at node 306, links B, C, and D each require new unique 128-bit numerical identifiers. Link A from a prior version of the map is split into links B and C in the new version of the map due to the addition of new link D. A random 128-bit number identifier may be assigned to link D as the numerical identifier represented as ID_D, and a random 128-bit number identifier may be assigned to link B represented as ID_B. Original link A has a numerical identifier represented as ID_A.

According to example embodiments described herein, the numerical identifier for link C is set to ID_C=XOR(ID_A, ID_B). Link B is assigned identifier ID_B and link C is assigned identifier ID_C based on the above. Since ID_A was chosen as a random number when link A was created, and ID_B is a random number, ID_C can also be treated as a random number. The risk of collision among these random numbers for a 128-bit identifier, or even among 64-bit identifiers is low. For the 128-bit identifier case, assuming the creation of 2^32 (4 billion) new links per year, which is unrealistically high, after 128 years, 2^39 new links will have been created. The risk of two identifiers being the same during that time is roughly one in 2*10^15. An infinitesimally small risk that is highly unlikely to occur. While 128-bit and 64-bit identifiers are described above, shorter identifiers may be used, particularly when a global map is segmented and identifiers could be duplicated between different segments.

Due to the properties of the XOR function, the ID_C=XOR(ID_A, ID_B) also implies that ID_A=XOR (ID_B, ID_C) based on the associative property. Hence, there is a clear relationship between the old link identifier for link A (ID_A) and new link identifiers for links B and C (ID_B and ID_C, respectively). Thus, if a path references an identifier from the old map (ID_A) that cannot be found in the new map, a system only has to check whether there are two identifiers (ID_1 and ID_2) of two adjacent links in the new map with ID=XOR(ID_1, ID_2). This way, paths from the old version with links having been split can be uniquely and safely mapped to the new version.

An example embodiment will be described herein with respect to a route 400 calculated between an origin and a destination along a plurality of road segments or links by a map services provider 116 using the most recent, up-to-date map available. FIG. 4 illustrates a route between an origin at node 310 and a destination at node 312. The origin and destination do not need to be at a node and can be along a road link; however the origin and destination are shown as nodes for ease of illustration. The illustrated route of FIG. 4 includes road links from the origin to the destination, including road links 314 having link identifier ID_X and link 316 having link identifier ID_Y. Link 318 with link identifier ID_Z is illustrated as being a recently added road link, not present in a prior version of the map. FIG. 5 provides an indication of the road links of FIG. 4 in a prior version of the map, which may be maintained at a navigation device of a user. In response to the user requesting a route between the origin and the destination, the route may be provided including links 314 and 316 (ID_X and ID_Y, respectively). The route may be provided to the user in the form of a sequence of link identifiers for the navigation system to correlate to the map to provide route guidance to the user. However, the links 314 and 316 do not exist in the map version of the navigation device, such that the route does not correspond to the map of the navigation device and cannot be generated without embodiments described herein.

The navigation device of example embodiments, which may be illustrated as apparatus 200 including processor 202, may recognize that the route provided by the map services provider 116 includes links not corresponding to links of the navigation device map. In response, the navigation device may analyze combinations of links using methods described herein to determine if any existing links of the old version of the map correspond to new links of the new map version. The process may begin at the first link not recognized by the navigation device. In the illustrated embodiment, road link 314 having identifier ID_X is not found in the map of the navigation device. The navigation device may then take combinations of consecutive links using the XOR function to establish correspondence. In the illustrated embodiment, the navigation device, embodied by apparatus 200 using processor 202, may set ID_X equal to XOR (ID_W, ID_Y). Link 320 having identifier ID_W is selected as it is the road link emanating from the last node that corresponded to the route provided by map services provider 116. Link 316 having identifier ID_Y is selected as it is a road link continuous with link 314 having identifier ID_X. The function ID_X=XOR(ID_W, ID_Y) would return a true response, as link 320 having identifier ID_W was broken into link 314 having identifier ID_X and link 316 having identifier ID_Y.

While the correct link correspondence was found through the above-described embodiment, embodiments would also consider if link 320 having identifier ID_W corresponds to link 314 having identifier ID_X and link 318 having identifier ID_Z. This is because Link 320 having identifier ID_W is selected as it is the road link emanating from the last node that corresponded to the route provided by map services provider 116. Link 318 having identifier ID_Z is selected as it is a road link continuous with link 314 having identifier ID_X. The function ID_X=XOR(ID_W, ID_Z) would return a false response, as link 320 having identifier ID_W was not broken into link 314 having identifier ID_X and link 318 having identifier ID_Z.

While the aforementioned embodiments pertain to road links being split or broken into smaller road links, embodiments may also include road links that merge, such as where a road is removed from an intersection. Referring back to FIG. 3, the original map may include road links having identifiers ID_B, ID_C, and ID_D. The new map may include instead road link having identifier ID_A. In this case, the identifier for the road link between node 302 and node 304 may be generated. In the new version of the map, ID_A is set equal to XOR (ID_B, ID_C), and ID_A is assigned to the link between node 302 and node 304.

Embodiments described herein provide a clear relationship between the old road link identifiers and the new road link identifiers between map versions. Thus, if a path references two consecutive identifiers ID_1 and ID_2 from an old map that cannot be found in the new map, a client may then check whether the new map contains a link identifier that satisfies XOR(ID_1, ID_2). In this manner, paths from the old version of the map are uniquely and safely mapped to the merged link of a revised map.

Embodiments provided herein generate link identifiers under common map editing operations that can be integrated into map editing software. The link identifiers can either fully substitute existing identifier schemes or added as an attribute to the links to avoid drastic changes. Employing methods described above enable the generation of these identifiers after the fact by comparing maps such that instead of extending map editing, it can be done during compilation of raw map data to target formats. For example, embodiments could be carried as an additional attribute in various map formats such High Definition (HD) maps, Navigational Data Standard (NDS) maps, RDF mapping language, etc.

Embodiments described herein provide for the preservation of properties on longer chains of links. Given a path as a sequence of identifiers ID_1, . . . , ID_N in one map version and the corresponding sequence of identifiers ID'_1, . . . ID'_M in another map version, it holds that XOR (ID_1, . . . , ID_N)=XOR (ID'1, . . . ID'_M). As such, the same path can be uniquely identified across all map versions by applying the XOR function to all of the maps link IDs.

While the aforementioned examples have been relatively simplistic for ease of understanding, embodiments may be extrapolated to include considerably more road link options in establishing correspondence between an old map version and a new map version. FIG. 6 illustrates an extrapolated example embodiment in which road link having identifier ID_E extends between nodes 402 and 404 in an old map version. This section of a map may be in a suburban area where new residential developments are being constructed, such that a new map version is illustrated in FIG. 7. For road link having identifier ID_E to find the corresponding combination of links, numerous permutations may be attempted using the XOR function.

ID_E=XOR(ID_F,ID_Q): FALSE

ID_E=XOR(ID_F,ID_J): FALSE

ID_E=XOR(ID_F,ID_G): FALSE

ID_E=XOR(ID_FG,ID_H): FALSE

ID_E=XOR(ID_FJ,ID_K): FALSE

ID_E=XOR(ID_FJ,ID_L): FALSE

ID_E=XOR(ID_FQ,ID_S): FALSE

ID_E=XOR(ID_FQ,IR_R): TRUE

The consecutive links may be concatenated as the search for the correspondence progresses along a path and adds links, as shown by ID_FQ which corresponds to links having identifiers ID_F and ID_Q. As shown, the XOR function can be used to crawl along a series of consecutive links to establish the correspondence between links. This crawling can be limited to a predetermined number of combinations or degrees of progression (e.g., how many consecutive links to attempt to combine) before indicating that the attempt has failed.

Embodiments described above provide a mechanism for identifying road segments between different map versions repeatably and reliably such that map versions do not need to correspond in order for a client to understand a road segment provided by a server, or vice versa. While lack of correspondence between map versions can prompt map updates, embodiments described herein do not require map updates, and can seamlessly operate without map updates if needed.

According to example embodiments described herein, the server based map services provider 116 may use only a single variant of map data in the map database 108, thereby maintaining only a latest, most recent and accurate map. The client, such as mobile device 114 may be a pre-installed, potentially outdated map. For example, the mobile device may be embodied as a navigation system in a vehicle, where the map data on the mobile device may be installed at the time of vehicle assembly, and therefore may be stagnant and subject to becoming outdated. Such a lack of correspondence of map versions can be mitigated by using the XOR stable link identifiers described above. While the above described techniques may correlate link identifiers among map versions, communicating routes using the XOR stable link identifiers may consume substantial bandwidth, particularly if the route between an origin and destination includes many road links. Thus, embodiments provided herein employ a technique to reduce the bandwidth required to communicate routes between a server and a client while maintaining a high level of detail and accuracy for the generated route.

Server-Side Route Computation and Encoding

Embodiments described herein may not only communicate routes using map version agnostic road segment identifiers to communicate routes between different map versions, but may also encode the routes in a format that reduces bandwidth by sending a limited amount of information relating to the route, and employing the recipient to process the limited amount of information and identify road segments and/or portions of a route. To do this, road segments and route portions may be communicated using road segment midpoints (and z-levels as appropriate, described further below) to identify road segments, and using map-version-agnostic fingerprints to communicate route portions.

A midpoint of a road segment may be a coordinate of a point that is at or proximate the halfway point of the road segment. For example, a midpoint of a road segment that extends between two intersections or nodes and is a half-mile long may be a quarter mile from each intersection or node. An elevation may optionally be defined as a "z-level" of a road segment. The "z-level" or elevation of a road segment may typically be zero, though a road segment in a tunnel may have a negative z-level while stacked roads in bridges and interchanges may have a positive z-level. The z-level elevation describes the relative location of road segments in a vertical direction orthogonal to the ground. While a midpoint is described herein as a coordinate used as an anchor point or identifying point of a road segment, other points may be used as an anchor point from which a road segment can be identified. For example, an anchor point may be an end node, a midpoint, a point a predefined or random distance along a road segment but falling on the road segment, for example. As such, the midpoint identified is an example of an anchor point that is used herein to help define a road segment.

To generate a route, a user may identify, such as on a mobile device 114 or "client" an origin which may be a current location of the mobile device, a selected location (e.g., latitude-longitude), address, or a point-of-interest, for example. The user may also select a destination for the route, which may also include a selected location (e.g., latitude-longitude), an address, a point-of-interest, etc. The origin may be correlated to a "START_SEGMENT" as a road segment in the map data of the mobile device 114, which may be outdated. The destination may be correlated to a "TARGET_SEGMENT" as a road segment in the map data of the mobile device 114. The correlation between the origin and the START_SEGMENT and the destination and the TARGET_SEGMENT may be performed, for example, through map-matching of the identified origin and destination to respective road segments.

The client (e.g., mobile device 114) may send a routing request to the server by encoding a start point. The start point may be encoded as the midpoint +z-level of the road segment or "START_SEGMENT" corresponding to the origin of the requested route of the client. The destination may be encoded as the midpoint +z-level of the "TARGET_SEGMENT", where the TARGET_SEGMENT corresponds to a destination of the client requested route. The client may optionally send the XOR-Stable identifiers of the START_SEGMENT and the TARGET_SEGMENT. The XOR-Stable identifiers may be identifiers of road links within the map version of the client which have been processed as described above for road updates using the XOR function such that future updates to the map data may be properly correlated to prior iterations of map data. Optionally, rather than identifying a road link, a routing request may include only an origin and a destination, where the origin and destination may be identified by address, latitude-longitude, point-of-interest, or the like. In such an embodiment, the server may be configured to map-match the origin and/or destination to an appropriate START_SEGMENT and TARGET_SEGMENT, respectively. In addition to the origin and destination, however identified by the client, the client sends a number N as the number of intermediate segment anchor points are wanted in the route from the server.

Based on the provided origin (START) and destination (TARGET), the server (e.g., map services provider 116) may find the appropriate segments in the latest map version. In response to receiving the identification of a START_SEGMENT and TARGET_SEGMENT as a midpoint and z-level, the server may process the input data with a tolerance, such as a few meters, by which an error of the midpoint provided by a client may differ from a corresponding midpoint identified by the server. Further, the z-level may be used for clarifying or "tie-breaking" the selected road segment in the event tunnels, bridges, or interchanges are located along the road segment identified by the midpoint. Optionally, the server may use the XOR-Stable identifiers of the START_SEGMENT and the TARGET_SEGMENT to find the proper links if there are multiple candidates for the START and TARGET.

If a map services provider cannot exactly match the START to its map, a warning will be flagged in a response to the client. In such a scenario, the user may be warned that they need to move locations (e.g., progress along a road segment or reach a new road segment) as the user is in an undefined location. Similarly, if a TARGET is not properly identified by the map services provider, a warning may be provided to a user that the TARGET is not reachable according to current map data and a revised TARGET destination should be selected. Optionally, the START and TARGET may be matched as closely as possible to the map, but alerting the driver that they need to drive to the route as they are "off-road".

Once a START_SEGMENT and TARGET_SEGMENT are adequately identified by the server, a route may be generated using the latest map version. The route may be established based on a shortest and/or fastest route using a cost function for each road segment between the origin and the destination, with the goal of minimizing the cost function for the shortest/fastest route. The server may compute the route on the road network where segment-traversal costs are computed from real-time and historical traffic patterns to estimate current travel times. In computing the fastest route, the expected traffic speeds along each road segment considered for the route may be used based on real-time data and optionally incorporating historical traffic speed data. In this way the cost function may be used to establish the route with the lowest time cost between the origin and the destination while considering the influence of traffic along each route. The server may then compute the fastest route between the START_SEGMENT and TARGET_SEGMENT using the latest map. Optionally, as described above, the server may calculate the lowest cost route, which may coincide with the fastest route. The identified route provided to the client may be established based, at least in part, on client preferences, such as avoiding tolls, avoiding highways, including High-Occupancy Vehicle (HOV) lanes, etc., as these preferences may impact the route selection.

The identified route may be segmented according to the number of segments N requested by the client. Optionally, in response to no specified number of segments provided by a client, a default number of segments may be used. The default number of segments may be a set number, such as a number that produces reliable results with minimal bandwidth, or the default number of segments may be based on a length (either distance or time) of the route. For example, longer routes may include a higher default value for the number of segments N.

The number of segments along the route are roughly equally distributed, and they are denoted $V\_1$ to $V\_N$. If N is zero, no segment is chosen. The route is divided into N+1 route fragments $R\_0$ to $R\_N$. In such a scenario, the fragment $R\_0$ is the route segment between and not including START_SEGMENT and $V\_1$. The fragment $R\_1$ is the route between and not including $V\_1$ and $V\_2$. This continues until the fragment $R\_N$ is the route between and not including $V\_N$ and TARGET SEGMENT. Notably, a fragment can be empty if two segments are adjacent.

The segments along the route may be selected based on dividing the total distance of the route by the number "N" to establish the distance between each of the N segments, "distanceV". Optionally, for each $n[1, N-1]$, a distance may be calculated as n*distance along the route, and denoting the segment at that distance as route segment $V\_n$. As road segments may be of differing lengths, the distance between the N segments may not be equal, and the spacing can be based on the approximate distance between N segments and selecting the most appropriate segment as $V\_N$. The total number of links along the route may be counted, and the total number of links divided by N (number-of-links/N). Each selected link may be n*(number-of-links/N) in the sequence of route links $V\_n$. The number of segments may also be established based on a minimum number of segments per a unit of distance, or a minimum number of segments based on a number of road links in a route. In this manner, the route segments may not exceed a certain number of road links within a route segment.

For each of the "N" intermediate segment anchor points, a corresponding intermediate road segment identified V_n. The intermediate road segments may be a subset of the total number of road segments between an origin and a destination. The number of intermediate segment anchor points is less than the total number of road segments between the origin and the destination as having the number of intermediate segment anchor points being equal to the total number of road segments does not achieve the benefits of the present disclosure, As such, V_1 to V_N is always a smaller subset than the full set of route links between the origin and the destination.

FIG. 8 illustrates an example embodiment according to the present disclosure of a sequence of road segments forming a route. According to the illustrated embodiment, a START_SEGMENT=1 from origin 305, while a TARGET_SEGMENT=12 to a destination 310, the route including segments 1, 2, 3, 4, 5, 6, 7, 8, 9, 10, 11, and 12. Letting N=2, for two intermediate segments along the route, V_1=5, and V_2=9. This results in route fragments of R_0=(2, 3, 4); R_1=(6, 7, 8); and R_2=(10, 11).

For each frament R_0 . . . R_N in the route, the server may identify the XOR-Stable link identifiers XF_0 . . . XF_N. To do this, the server may retrieve the link identifiers or "LinkIDs" of each of the segments of R_i and calculate XF by bitwise XORing the LinkIDs corresponding to R_0 . . . R_N. For example, for segments 1-12, the link identifiers are shown in the table of FIG. 9. The link identifiers are shown in binary and also in hexadecimal or HEX. FIG. 10 illustrates the logic for calculating XF for each LinkID. The server then sends a response to the route request from the client including the midpoint and z-level of V_1 . . . V_N, with the midpoint and z-level identified as P_1 . . . P_N corresponding to segments V_1 . . . V_N, and the fingerprints XF_0 . . . XF_N of the route fragments R_0 . . . R_N to the client. FIG. 11 illustrates the XOR_ROUTE that may be sent by the server to the client according to an example embodiment provided herein. As shown, P_1 includes "V_1_Mid-lat" as the midpoint latitude of V_1, "V_1_Midp-lon" as the midpoint longitude of V_1, and V_1_Midp-Zlevel" as the z-level of the midpoint of V_1. Similarly, the fingerprint XF_0 of route segment R_0 is shown in hexadecimal as "3a". The fingerprint XF_0 is calculated based on application of the XOR algorithm to the hexadecimal values of segments 2, 3, and 4:

(b1 XOR 76b)XOR fd=3a

The calculation of fingerprints XF_1 and XF_2 are performed in the same manner based on their respective segment LinkIDs. These calculated route fragments are encoded according to the calculation such that XF_1 and XF_2 are encoded route fragments.

Using the aforementioned methods, a route between an origin and a destination may be provided to a client using the midpoint/z-levels of the segments V_1 . . . V_N and the fingerprints XF_0 . . . XF_N to minimize the data payload required, thereby reducing the bandwidth consumed and improving the efficiency of communication of the route from the server to the client.

Client-Side Route Decoding

Upon receipt of the midpoint/z-levels of the segments and the route fragment fingerprints, the client uses the midpoint/z-levels of the segments V1 . . . V_N (received as P_1 . . . P_N) and the fingerprints XF_0 . . . XF_N to reconstruct the route generated by the server. During reconstruction of the route, the client can identify any issues with the route that may occur due to mis-matched map versions and either self-heal the mis-match using the XOR stable link identifiers, flag a map region of the client map for update, or identify portions of the route to the server that need to be recomputed or changed. The below described embodiment builds on the server-provided route including START_SEGMENT, segment V_1, segment V_2, and TARGET_SEGMENT, and route fragments R_0 between the START_SEGMENT and V_1, route fragment R_1 between V_1 and V_2, and route fragment R_2 between V_2 and TARGET_SEGMENT.

In an embodiment in which the client provides the START_SEGMENT and TARGET_SEGMENT to the server for the route (e.g., in the form of a midpoint and z-level for each), the client uses the received P_1 to find corresponding segment V_1 on the client database. If the client provided a location for an origin and destination to the server for route generation, the client may need to first decode the START_SEGMENT to begin route decoding, in the same manner that segment V_1 is decoded.

The client may use map-matching techniques to find segment V_1 corresponding to P_1 received from the server based on the midpoint latitude, longitude, and z-level of P_1. If a corresponding segment is not found, the client may provide a request to a user to update the map, and the update may be specifically targeted to the area of P_1 as the client understands that this area of the map is outdated. This enables a targeted map update rather than requiring an entire map update, thereby saving bandwidth, processing capacity, and time. The map update may include updating a map tile where the midpoint is located, updating a map within a bounding box or radius about the midpoint P_1, or updating the region encompassing the midpoint P_1. If a user does not wish to update the client-side map, there are two options for proceeding. The client may identify links of the client side map that correspond to the segment V_1 based on the stable XOR link identifiers of segment V_1 as described above. In this manner, the client can properly correlate the segment V_1 to road segments or a portion of a road segment that exists in the client side map database. Optionally, the client can send midpoint P_1 back to the server as a "banned" point whereby the server is requested to re-route and avoid any banned road segment(s) corresponding to the banned mid-point(s).

The client may compute the shortest/fastest path or route R_0 between the START_SEGMENT and V_1, route segment R_1 between V_1 and V_2, and the route segment R_2 between V_2 and the TARGET_SEGMENT. The route generation process may be the process used at the server, such as a cost-based routing to establish the lowest cost route, for example. Optionally, the client may compute alternative routes. The client may have a different map version than the server, which may lead to different route calculations, or the method of route calculation may be affected by the map versions used. In some instances, traffic estimates may differ between the client and the server, such as if a server uses historical data for predictive traffic estimation, while a client uses real-time traffic updates. The client uses the XOR route fragment encoding procedure to compute XOR route fragments XG_0, XG_1, and XG_2 for R_0, R_1, and R_2, respectively. If XF_0=XG_0, XF_1=XG_1, and XF_2=XG_2 the client route fragments must equal the server-side route fragments. The algorithm then successfully stops and the final route established is:

(START_SEGMENT, R_0, V_1, R_1, V_2, R_2, TARGET SEGMENT). If a client has calculated alternate routes, the client may use the XOR route fragment encoding procedure to compute XOR route fragments for the alternate routes, and may compare these encoded alternate route fragments to the encoded server-side route fragments to increase the likelihood of establishing a match between the client generated route and the server generated route.

As the XOR LinkID encoding scheme is used, the client side XOR will still match even if the links in the fragment have been split and/or merged in different versions of the map database—ball are members of the same path and should produce the same XOR fragment identifier. If F_0 (server generated route for R_0) differs from G_0 (client generated route for R_0), the route fragment R_0 differs from the corresponding fragment at the server. The client then recursively executes the algorithm though with TARGET_SEGMENT=V_1, thereby breaking the route down and reducing the routing problem to the first route fragment by shortening the overall route calculation to only focus on the portion between the START_SEGMENT and V_1 (by making V_1 the TARGET SEGMENT). If F_1 differs from G_1, the route fragment R_1 differs from the corresponding fragment at the server. Then client then recursively executes this algorithm but with START_SEGMENT=V_1 and TARGET_SEGMENT=V_2, thereby breaking the route down and reducing the routing problem to the second route fragment by shortening the overall route calculation to only focus on the portion between the V_1 (now the START_SEGMENT) and V_2 (now the TARGET_SEGMENT). This algorithm continuously recurses into mismatching route fragments and requests an intermediate point and two new XOR route fragment IDs until all fragments match. This reduces the route calculation to only route fragments that fail to correspond between the client and the server, thereby improving efficiency and reducing the bandwidth consumed.

The resultant route is a valid route in the map of the client as the rules of the algorithm require traversal of legal maneuvers only. This algorithm further minimizes client-server communication by having the client only ask for details where the route segments are not found within the client map database. While the algorithm identifies regions that require a map update (e.g., through midpoints or road segments not found), the algorithm can proceed with route generation even if the map is not updated.

When a client receives a route represented by the midpoints/z-levels (P_0 . . . P_N) and route fragment identifiers (XF_0 . . . XF_N) that can be properly map-matched at the client, the client can present the route or routes and begin guidance to the destination. Guidance may be in the form of navigational assistance to a driver of the vehicle, or optionally include some degree of autonomous driving up to and including fully autonomous vehicle control to autonomously drive the vehicle to the destination. The server of example embodiments, such as map services provider 116, may provide the client, such as mobile device 114, with one or more routes that optimizes efficiency in distance or time, or according to other client-defined preferences.

A benefit of using XOR stable link identifiers in establishing route fragment identifiers is that the route fragments of local map version of a client need not match identically route fragments of a server map version. For example, a portion of a route in a server-side map version may include road segments B and C as illustrated in FIG. 3, while the client may have an older version of the map and not identify road segments B and C. However, using XOR stable identifiers, the XOR identifier of road segment A is the same as the XOR identifier of road segments B and C as identifier A=identifier B XOR identifier C or A=B XOR C. Thus, if the identifiers for a route fragment are established through the XOR concatenation of the road segments, the local map version does not need to include road segments B and C to arrive at the same route fragment that includes road segment A. Map-matching algorithms require processing-intensive geometric functions to determine if a coordinate point matches a link representation on a map. Through the user of XOR stable link identifiers in establishing route fragments as described herein, the map-matching algorithms may only need to map-match Start, Target, and Intermediate segments, while using faster, more efficient Boolean operations for the comparison between XOR identifiers. XOR identifier comparison is substantially more efficient than map-matching such that processing requirements may be reduced and the transmission bandwidths for routes may be substantially reduced.

The result of embodiments described herein is a valid route in the client as the rules in the algorithm only traverse legal maneuvers. The algorithm minimizes client-server communication and thus bandwidth by only asking for details on pieces where route fragments and/or XOR-Stable links cannot be correlated between map versions. The algorithm of example embodiments discovers regions that require map updates and can provide a fallback if the user does not want to update the map, or if they are in a region of poor signal reception whereby map updates are not practical.

FIGS. 12 and 13 are flowcharts illustrative of methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 12 illustrates a flowchart depicting a method of generating and communicating low bandwidth map format agnostic routes between origins and destinations to allow route communication between different map formats or versions using reduced bandwidth. FIG. 12 illustrates a method from the perspective of a client including operations performed by a client, such as a mobile device 114 operating as a client and embodied by an apparatus, such as apparatus 200 of FIG. 2. A route may be requested between an origin and a destination. As noted above, the origin and/or the destination may be a point location (e.g., latitude and longitude), a point-of-interest, a road segment, or the like. One or more intermediate segment anchor points for a requested route between an origin and a destination may be received at 510. Encoded server-provided route fragments may be received at 520. The encoded route fragments received from a server may be encoded to, in part, reduce the bandwidth of transmitted data and may reduce the memory footprint of the route fragments when stored at a server, client, or in temporary memory. One or more intermediate segments may be identified at 530 corresponding to the one or more intermediate segment anchor points. A route may be generated between the origin and the destination, the route including the one or more intermediate segments and a plurality of client-generated route fragments, each client-generated route fragment including one or more client-generated route fragment road segments, as shown at 540. Each client-generated route fragment is encoded at 550 through application of an XOR algorithm to the client-generated route fragment road segments of a respective client-generated route fragment. The encoded client-generated route fragments are then compared at 560 to the encoded server-provided route fragments. In response to the encoded client-generated route fragments corresponding with the encoded server-provided route fragments, navigational assistance for traveling along the route is provided at 570. Navigational assistance may be in the form of route guidance to a driver, semi-autonomous or fully autonomous vehicle control along the route, or a combination thereof.

FIG. 13 illustrates a flowchart depicting a method of generating and communicating low bandwidth map format agnostic routes between origins and destinations to allow route communication between different map formats or versions using reduced bandwidth. FIG. 13 illustrates a method from the perspective of a server including operations performed by a server, such as a map service provider 116 operating as a server and embodied by an apparatus, such as apparatus 200 of FIG. 2. As shown, an indication of a route request is received at 610 between an origin and a destination. A starting road segment corresponding to the origin is identified at 620, and a target road segment is identified at 630 corresponding to the destination. A route is generated at 640 between the starting road segment and the target road segment including a plurality of road segments. One or more intermediate segments are identified at 650 from the plurality of road segments, where each intermediate segment includes an anchor point. A plurality of route fragments are generated at 660, where each route fragment includes one or more route fragment road segments. At 670 each route fragment is encoded by applying an XOR algorithm to identifiers of the route fragment road segments of a respective route fragment. The encoded route fragments and the one or more anchor points of the one or more intermediate segments are provided in response to the route request at 680.

In an example embodiment, an apparatus for performing the methods of FIGS. 12 and/or 13 above may comprise a processor (e.g., the processor 202) configured to perform some or each of the operations (510-570, 610-680) described above. The processor may, for example, be configured to perform the operations (510-570, 610-680) by performing hardware implemented logical functions and/or executing stored instructions for performing each of the operations. Alternatively, the apparatus may comprise means for performing each of the operations described above. In this regard, according to an example embodiment, examples of means for performing operations 510-570, 610-680 may comprise, for example, the processor 202 and/or a device or circuit for executing instructions for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive an indication of a route request between an origin and a destination;
   identify a starting road segment corresponding to the origin;
   identify a target road segment corresponding to the destination;
   generate a route between the starting road segment and the target road segment, the route comprising a plurality of road segments;
   identify one or more intermediate segments from the plurality of road segments, each intermediate segment having an anchor point;
   generate a plurality of route fragments from the route, each route fragment including one or more route fragment road segments;
   encode each route fragment by applying an XOR algorithm to identifiers of the route fragment road segments of a respective route fragment; and
   provide the encoded route fragments and one or more anchor points of the one or more intermediate segments in response to the route request.

2. The apparatus of claim 1, wherein the route request between the origin and the destination includes identification of an anchor point and elevation of a road segment corresponding to the origin and identification of an anchor point and elevation of a road segment corresponding to the destination, and wherein causing the apparatus to identify the starting road segment and to identify the target road segment comprises causing the apparatus to:
  identify the starting road segment based on the anchor point and elevation of the road segment corresponding to the origin; and
  identify the target road segment based on the anchor point and elevation of the road segment corresponding to the destination.

3. The apparatus of claim 1, wherein causing the apparatus to establish a plurality of route fragments from the route comprises causing the apparatus to:
  establish route fragments comprising one or more road segments between the starting road segment and a first intermediate road segment, between a last intermediate road segment and the target road segment, and between any intermediate road segments.

4. The apparatus of claim 1, wherein causing the apparatus to identify one or more intermediate segments comprises causing the apparatus to:
  select one or more intermediate road segments along the route between the starting road segment and the target road segment, wherein the one or more intermediate road segments is less than a total number of road segments between the starting road segment and the target road segment.

5. The apparatus of claim 4, wherein the one or more intermediate road segments are selected based on a number of intermediate road segments and a total length of the route.

6. The apparatus of claim 1, wherein each of the one or more intermediate segments further comprises an elevation, and wherein causing the apparatus to provide the encoded route fragments and one or more anchor points of the one or more intermediate segments in response to the route request comprises causing the apparatus to provide the encoded route fragments, the one or more anchor points of the one or more intermediate segments, and the one or more elevations of the one or more intermediate segments in response to the route request.

7. The apparatus of claim 1, wherein the encoded route fragments include a first encoded route fragment extending between a starting point of a corresponding first route fragment and an ending point of the first route fragment, and wherein the apparatus is further caused to:
  receive a request for a revised encoded route fragment to replace the first encoded route fragment and at least one banned road segment;
  generate a revised route fragment between the starting point of the first route fragment and the ending point of the first route fragment, wherein the revised route is generated to exclude the at least one banned road segment;
  encode the revised route fragment to generate a revised encoded route fragment; and
  provide the revised encoded route fragment in response to the request for the revised encoded route fragment.

8. A computer program product comprising at least one non-transitory computer-readable storage medium having computer-executable program code portions stored therein, the computer-executable program code portions comprising program code instructions configured to:
  receive an indication of a route request between an origin and a destination;
  identify a starting road segment corresponding to the origin;
  identify a target road segment corresponding to the destination;
  generate a route between the starting road segment and the target road segment, the route comprising a plurality of road segments;
  identify one or more intermediate segments from the plurality of road segments, each intermediate segment having an anchor point;
  generate a plurality of route fragments from the route, each route fragment including one or more route fragment road segments;
  encode each route fragment by applying an XOR algorithm to identifiers of the route fragment road segments of a respective route fragment; and
  provide the encoded route fragments and one or more anchor points of the one or more intermediate segments in response to the route request.

9. The computer program product of claim 8, wherein the route request between the origin and the destination includes identification of an anchor point and elevation of a road segment corresponding to the origin and identification of an anchor point and elevation of a road segment corresponding to the destination, and wherein the program code instructions to identify the starting road segment and to identify the target road segment comprise program code instructions to:
  identify the starting road segment based on the anchor point and elevation of the road segment corresponding to the origin; and
  identify the target road segment based on the anchor point and elevation of the road segment corresponding to the destination.

10. The computer program product of claim 8, wherein the program code instructions to establish a plurality of route fragments from the route comprise program code instructions to:
  establish route fragments comprising one or more road segments between the starting road segment and a first intermediate road segment, between a last intermediate road segment and the target road segment, and between any intermediate road segments.

11. The computer program product of claim 8, wherein the program code instructions to identify one or more intermediate segments comprise program code instructions to:
  select one or more intermediate road segments along the route between the starting road segment and the target road segment, wherein the one or more intermediate road segments is less than a total number of road segments between the starting road segment and the target road segment.

12. The computer program product of claim 11, wherein the one or more intermediate road segments are selected based on a number of intermediate road segments and a total length of the route.

13. The computer program product of claim 8, wherein each of the one or more intermediate segments further comprises an elevation, and wherein the program code instructions to provide the encoded route fragments and one or more anchor points of the one or more intermediate segments in response to the route request comprise program code instructions to provide the encoded route fragments, the one or more anchor points of the one or more intermediate segments, and the one or more elevations of the one or more intermediate segments in response to the route request.

14. The computer program product of claim 8, wherein the encoded route fragments include a first encoded route fragment extending between a starting point of a corresponding first route fragment and an ending point of the first route fragment, the computer program product further comprising program code instructions to:

receive a request for a revised encoded route fragment to replace the first encoded route fragment and at least one banned road segment;

generate a revised route fragment between the starting point of the first route fragment and the ending point of the first route fragment, wherein the revised route is generated to exclude the at least one banned road segment;

encode the revised route fragment to generate a revised encoded route fragment; and provide the revised encoded route fragment in response to the request for the revised encoded route fragment.

15. A method comprising:

receiving an indication of a route request between an origin and a destination;

identifying a starting road segment corresponding to the origin;

identifying a target road segment corresponding to the destination;

generating a route between the starting road segment and the target road segment, the route comprising a plurality of road segments;

identifying one or more intermediate segments from the plurality of road segments, each intermediate segment having an anchor point;

generating a plurality of route fragments from the route, each route fragment including one or more route fragment road segments;

encoding each route fragment by applying an XOR algorithm to identifiers of the route fragment road segments of a respective route fragment; and providing the encoded route fragments and one or more anchor points of the one or more intermediate segments in response to the route request.

16. The method of claim 15, wherein the route request between the origin and the destination includes identification of an anchor point and elevation of a road segment corresponding to the origin and identification of an anchor point and elevation of a road segment corresponding to the destination, and wherein identifying the starting road segment and identifying the target road segment comprises:

identifying the starting road segment based on the anchor point and elevation of the road segment corresponding to the origin; and identifying the target road segment based on the anchor point and elevation of the road segment corresponding to the destination.

17. The method of claim 15, wherein establishing a plurality of route fragments from the route comprises:

establishing route fragments comprising one or more road segments between the starting road segment and a first intermediate road segment, between a last intermediate road segment and the target road segment, and between any intermediate road segments.

18. The method of claim 15, wherein identifying one or more intermediate segments comprises:

selecting one or more intermediate road segments along the route between the starting road segment and the target road segment, wherein the one or more intermediate road segments is less than a total number of road segments between the starting road segment and the target road segment.

19. The method of claim 18, wherein the one or more intermediate road segments are selected based on a number of intermediate road segments and a total length of the route.

20. The method of claim 15, wherein each of the one or more intermediate segments further comprises an elevation, and wherein providing the encoded route fragments and one or more anchor points of the one or more intermediate segments in response to the route request comprises providing the encoded route fragments, the one or more anchor points of the one or more intermediate segments, and the one or more elevations of the one or more intermediate segments in response to the route request.

* * * * *